US012123590B2

(12) United States Patent
Anma et al.

(10) Patent No.: US 12,123,590 B2
(45) Date of Patent: Oct. 22, 2024

(54) LIGHTING DEVICE

(71) Applicant: MINEBEA MITSUMI Inc., Nagano (JP)

(72) Inventors: Mio Anma, Kitasaku-gun (JP); Ryohei Takayama, Kitasaku-gun (JP); Ryo Haneda, Kitasaku-gun (JP); Akari Yamada, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/558,843

(22) PCT Filed: Jan. 25, 2022

(86) PCT No.: PCT/JP2022/002697

§ 371 (c)(1),
(2) Date: Nov. 3, 2023

(87) PCT Pub. No.: WO2022/239308

PCT Pub. Date: Nov. 17, 2022

(65) Prior Publication Data

US 2024/0219001 A1 Jul. 4, 2024

(30) Foreign Application Priority Data

May 12, 2021 (JP) ................................ 2021-080744

(51) Int. Cl.
*F21V 5/04* (2006.01)
*F21V 5/00* (2018.01)
(Continued)

(52) U.S. Cl.
CPC .............. *F21V 5/048* (2013.01); *F21V 5/008* (2013.01); *F21V 5/045* (2013.01); *F21V 7/0066* (2013.01);
(Continued)

(58) Field of Classification Search
CPC .......... F21V 5/048; F21V 5/008; F21V 14/06; F21V 14/065
See application file for complete search history.

(56) References Cited

U.S. PATENT DOCUMENTS 10,215,369 B2 2/2019 Fujisawa et al.
2013/0088142 A1 4/2013 Allen
(Continued)

FOREIGN PATENT DOCUMENTS

JP 2015-225799 A 12/2015
JP 2016-219113 A 12/2016
(Continued)

OTHER PUBLICATIONS

English translation of the Written Opinion for corresponding International Application No. PCT/JP2022/002697 mailed Mar. 22, 2022.

(Continued)

*Primary Examiner* — Sean P Gramling
(74) *Attorney, Agent, or Firm* — Pearne & Gordon LLP

(57) ABSTRACT

A lighting device according to an embodiment includes a light source, a cup lens, and a condenser lens. The light source emits light in a punctiform manner. The cup lens is arranged at the emission side of the light source. The condenser lens is arranged at the emission side of the cup lens. The cup lens includes: a bottom surface having a first outer shape and having a substantially circular shape; a top surface having a second outer shape larger than the first outer shape and having a substantially circular shape, the top surface being at the emission side of and spaced apart from the bottom surface in the optical axis direction; a side surface continuous with the bottom surface and the top surface; and a recessed part having a substantially cylindri-
(Continued)

cal shape, provided substantially at the center of the bottom surface, and accommodating the light source.

5 Claims, 43 Drawing Sheets

(51) Int. Cl.

| | |
|---|---|
| ***F21V 7/00*** | (2006.01) |
| ***F21V 7/04*** | (2006.01) |
| ***F21V 13/04*** | (2006.01) |
| ***F21V 14/06*** | (2006.01) |
| *F21Y 101/00* | (2016.01) |
| *F21Y 113/17* | (2016.01) |

(52) U.S. Cl.
CPC .............. *F21V 7/041* (2013.01); *F21V 13/04* (2013.01); *F21V 14/06* (2013.01); *F21Y 2101/00* (2013.01); *F21Y 2113/17* (2016.08)

(56) References Cited

U.S. PATENT DOCUMENTS

2017/0074488 A1 3/2017 Fujisawa et al.
2017/0299145 A1 10/2017 Dong

FOREIGN PATENT DOCUMENTS

JP 2020-077602 A 5/2020
WO WO-2016181905 A1 * 11/2016 ................ F21S 2/00

OTHER PUBLICATIONS

International Search Report for corresponding International Application No. PCT/JP2022/002697 mailed Mar. 22, 2022.
Written Opinion for corresponding International Application No. PCT/JP2022/002697 dated Mar. 22, 2022.
Notice of Reasons for Refusal dated May 24, 2022 for corresponding Japanese Application No. 2021-080744 and English translation.
Notice of Reasons for Refusal dated Sep. 20, 2022 for corresponding Japanese Application No. 2021-080744 and English translation.

* cited by examiner

LIGHTING DEVICE

CROSS REFERENCE TO RELATED APPLICATIONS

This application is a continuation of International Application No. PCT/JP2022/002697, filed on Jan. 25, 2022, which claims priority to Japanese Patent Application 2021-080744, filed on May 12, 2021, which is incorporated herein by reference.

TECHNICAL FIELD

The disclosure relates to a lighting device.

BACKGROUND

Lighting devices installed at the ceiling of facilities, or the like are known (see, e.g., JP 2015-225799 A or the like). In the lighting device illustrated in JP 2015-225799 A, a light source such as an LED (Light Emitting Diode) is arranged in the opening at the short diameter side of a reflector having a conical shape, and a condenser lens, such as a Fresnel lens, movable in the optical axis direction is provided in front of the light source and the reflector in the optical axis direction. By changing the interval between the light source and the condenser lens, the light distribution can be controlled from narrow light distribution to wide light distribution. The surface of the reflector is not a regular reflection surface (specular reflection surface), but a diffuse reflection surface such as white.

SUMMARY

However, the lighting device illustrated in JP 2015-225799 A has a problem because glare (glaring, dazzling) is likely to occur in a region slightly apart from the optical axis (e.g., a region of more than 40 deg from the optical axis) and the luminous flux ratio around the center (e.g., a region of 0 deg to 10 deg) cannot be increased. That is, the light incident on the condenser lens directly from the light source is controlled by the condenser lens to be distributed as designed, but the light diffusely reflected by the reflector travels to every angle as stray light and causes glare. In addition, most stray light does not travel to around the center, and thus the luminous flux around the center is decreased and the luminous flux ratio is reduced.

In view of the above, an object of the disclosure is to provide a lighting device capable of reducing glare and increasing the luminous flux ratio around the center.

To solve the above-described problems and achieve the object, a lighting device according to one aspect of the disclosure includes a light source, a cup lens, and a condenser lens. The light source emits light in a punctiform manner. The cup lens is arranged at the emission side of the light source. The condenser lens is arranged at the emission side of the cup lens. The cup lens includes: a bottom surface having a first outer shape and having a substantially circular shape; a top surface having a second outer shape larger than the first outer shape and having a substantially circular shape, the top surface being at an emission side of and spaced apart from the bottom surface in an optical axis direction; a side surface continuous with the bottom surface and the top surface; and a recessed part having a substantially cylindrical shape, provided substantially at the center of the bottom surface, and accommodating the light source.

A lighting device according to one aspect of the disclosure can reduce glare and increase the luminous flux ratio around the center.

DESCRIPTION OF EMBODIMENTS

Figure 1:
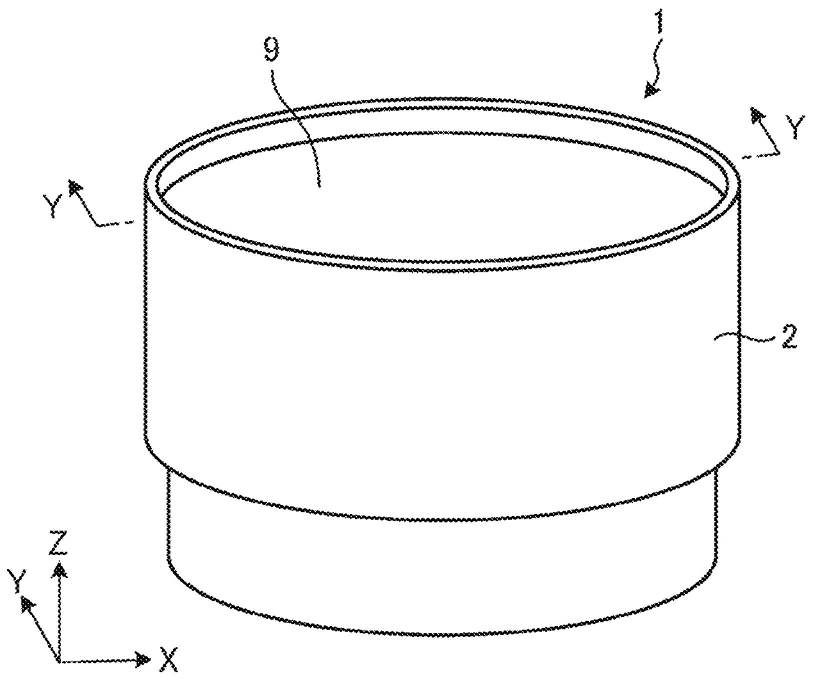
FIG. 1 is an external perspective view of a lighting device according to one embodiment.

A lighting device according to an embodiment will be described below with reference to the drawings. Note that the invention is not limited by this embodiment. Furthermore, the dimensional relationships between elements, proportions of the elements, and the like in the drawings may differ from reality. Among the drawings, parts having mutually different dimensional relationships and proportions may be included. Furthermore, the contents described in one embodiment or variation are applied in principle to other embodiments or variations.

Configuration

Figure 2:
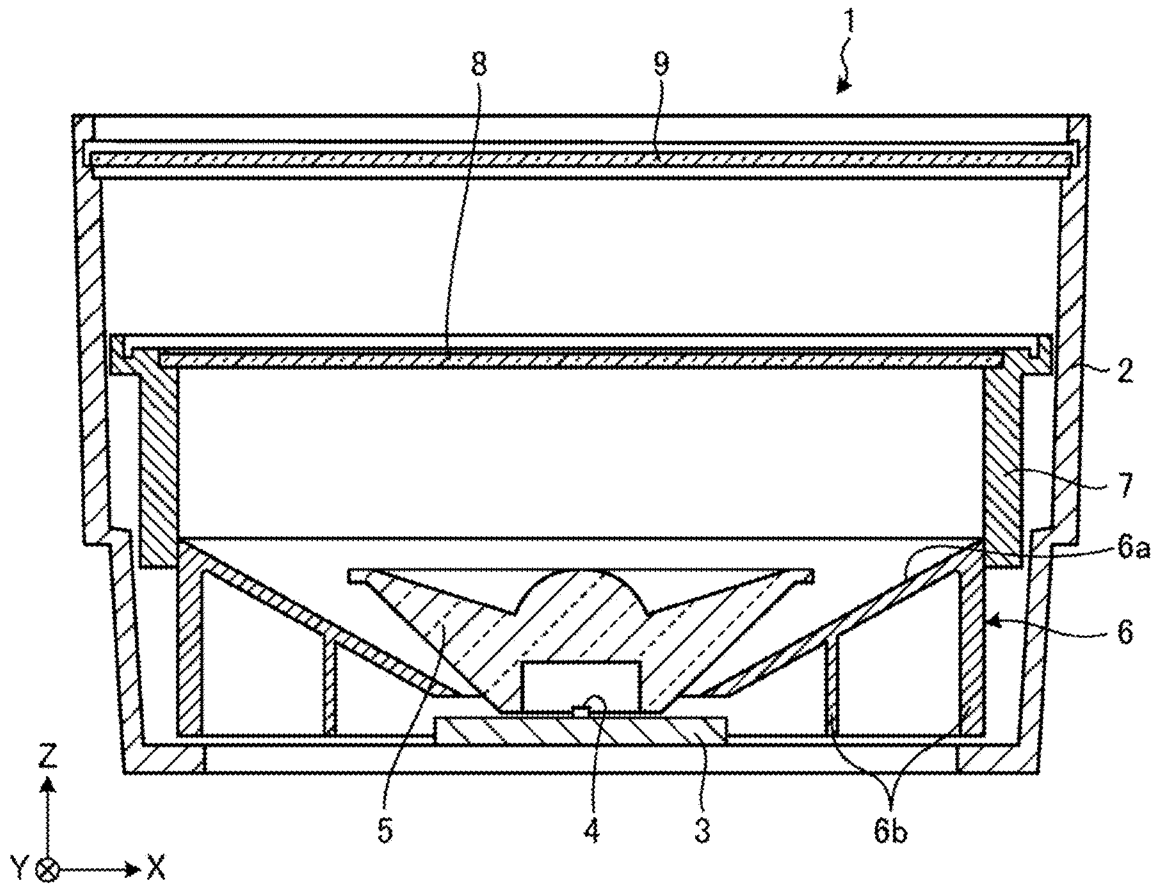
FIG. 2 is a cross-sectional view taken along Y-Y in FIG. 1.

FIG. 1 is an external perspective view of a lighting device 1 according to one embodiment. FIG. 2 is a cross-sectional view taken along Y-Y in FIG. 1. Note that although the coordinate axes (X, Y, Z) are illustrated to clarify the arrangement relationship of the members in each drawing, such coordinate axes are not related to the three-dimensional space defining the height direction generally as the Z axis, and the lighting device 1 can be used in any orientation.

In FIGS. 1 and 2, the lighting device 1 includes a frame 2, a light source holding part 3, a light source 4, a cup lens 5, a turn table 6, a condenser lens holding part 7, a condenser lens 8, and a cover lens 9. Note that a heat sink, a support arm, or the like are provided at the lower end of the frame 2, but are not illustrated.

The frame 2 has a substantially cylindrical shape. The light source holding part 3 has a substantially disk shape and is arranged at the center of one end of the frame 2 (the lower end in the drawing). At the center of the light source holding part 3, the light source 4 emitting light in a punctiform manner, such as an LED, is arranged. The cup lens 5 is arranged, at the emission side of the light source 4, enclosing the light source 4. Details of the cup lens 5 are described later.

The turn table 6 is a recycled version of the rotating reflector of a conventional product and includes a reflection surface 6*a* having a conical shape and a support wall 6*b* having a substantially cylindrical shape and supporting this reflection surface 6*a*. The reflection surface 6*a* is not used for the purpose of reflecting light in the present embodiment. The turn table 6 is arranged at one end of the frame 2 (the lower end in the drawing), and can rotate around the axis of rotation coinciding with the optical axis of the light source 4, by being driven by a motor or the like (not illustrated).

The condenser lens holding part 7 has a substantially cylindrical shape with one end (the lower end in the drawing) engaged with the outer support wall 6*b* of the turn table 6. A groove (not illustrated) having a spiral shape is provided at the outer surface of the outer support wall 6*b* of the turn table 6. A pin (not illustrated) is provided at the inner surface of the tube of the condenser lens holding part 7. With the pin of the condenser lens holding part 7 engaged with the groove of the support wall 6*b*, rotating the turn table 6 moves the condenser lens holding part 7 upward or downward in the drawing depending on the direction of rotation.

The condenser lens 8 is, for example, a Fresnel lens having a substantially disk shape and is fixed to the other end (top end in the drawing) of the condenser lens holding part 7. The cover lens 9 is a transparent plate having a substantially disk shape and is fixed to the other end (top end in the drawing) of the frame 2.

Figure 3A:
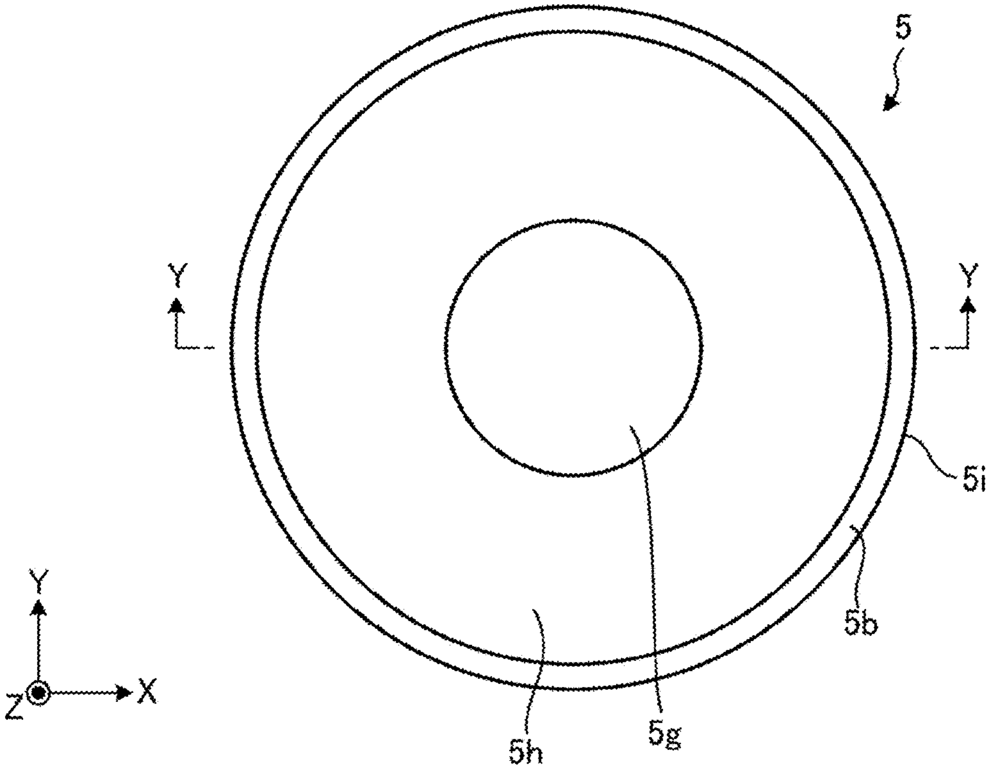
FIG. 3A is a plan view of a cup lens.
Figure 3B:
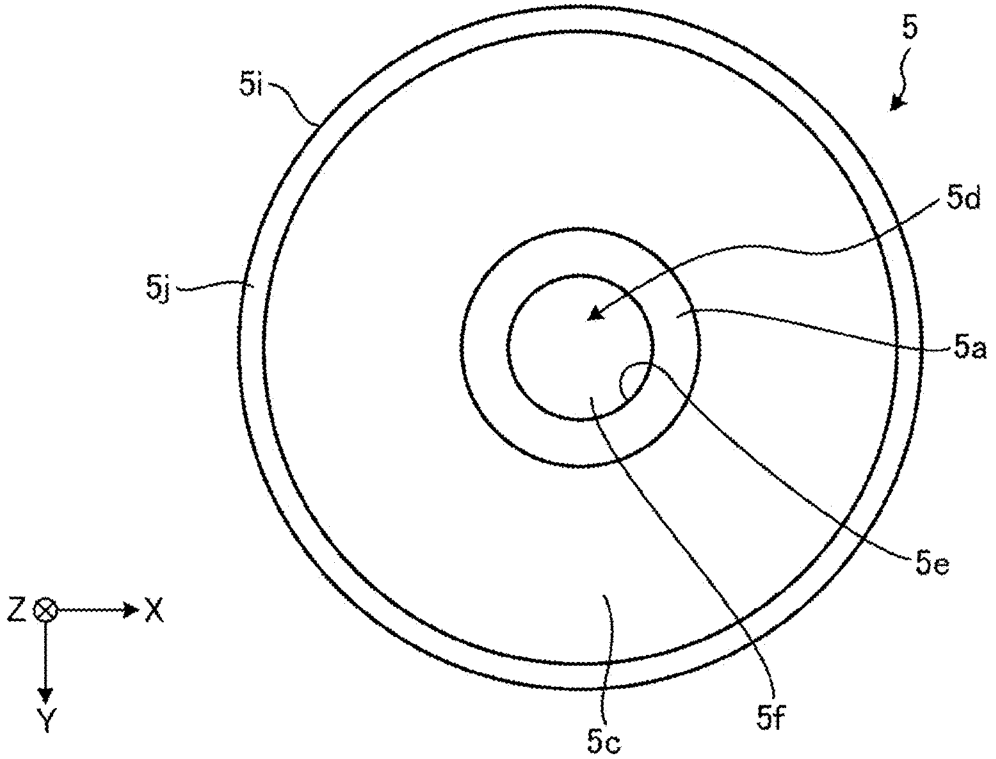
FIG. 3B is a bottom view of the cup lens.
Figure 3C:
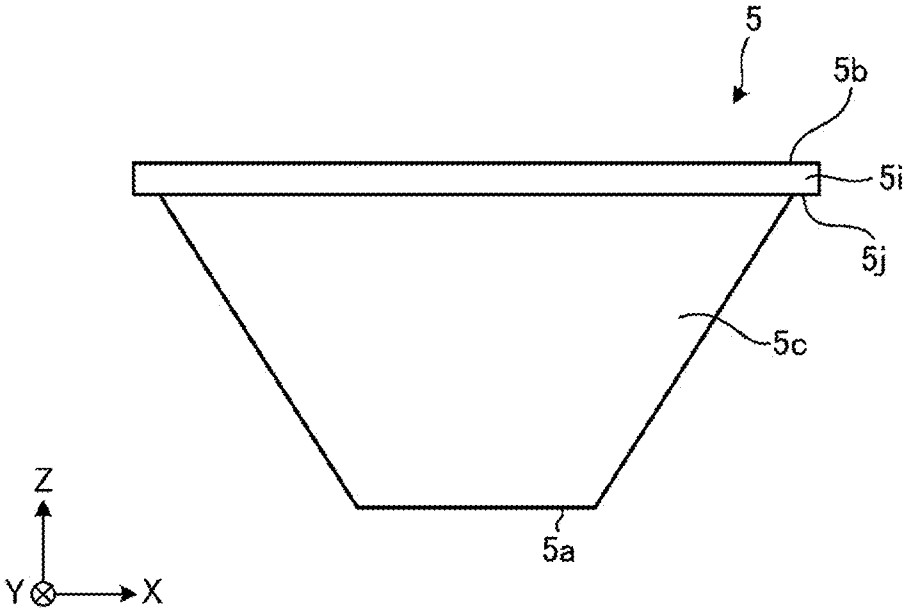
FIG. 3C is a front view of the cup lens.
Figure 3D:
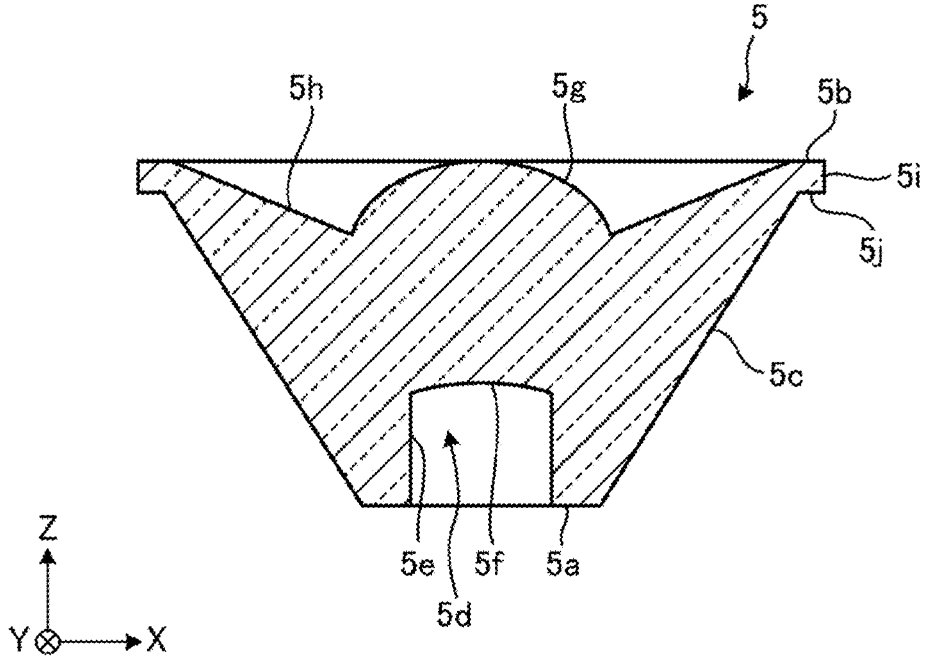
FIG. 3D is a cross-sectional view taken along Y-Y in FIG. 3A.

FIG. 3A is a plan view of the cup lens 5. FIG. 3B is a bottom view of the cup lens 5. FIG. 3C is a front view of the cup lens 5. FIG. 3D is a cross-sectional view taken along Y-Y in FIG. 3A.

In FIGS. 3A to 3D, the cup lens 5 includes: a bottom surface 5*a* having a first outer shape and having a substantially circular shape; a top surface 5*b* having a second outer shape larger than the first outer shape and having a substantially circular shape, the top surface 5*b* being at the emission side of and spaced apart from the bottom surface Sa in the optical axis direction; and a side surface 5*c* having a substantially conical surface shape and being continuous with the bottom surface 5*a* and the top surface 5*b* via an edge part 5*i* having a substantially cylindrical surface shape and a step part 5*j* having a substantially annular shape. A recessed part 5*d* having a substantially cylindrical shape and accommodating the light source 4 (FIG. 2) is provided substantially at the center of the bottom surface 5*a*. The recessed part 5*d* includes a wall surface 5*e* and a bottom surface (top surface) 5*f* forming the incident surface.

A protruding part 5*g* having a substantially hemispherical shape is provided, as a part of the emission surface, substantially at the center of the top surface 5*b*. In addition, a sloped part 5*h* having a substantially conical surface shape is provided sloping to the incident side from the outer peripheral part of the top surface 5*b* toward the center. The center side of the sloped part 5*h* is continuous with the protruding part 5*g*. One or both of the protruding part 5*g* and the sloped part 5*h* may be omitted.

Light Distribution Control

Figure 4A:
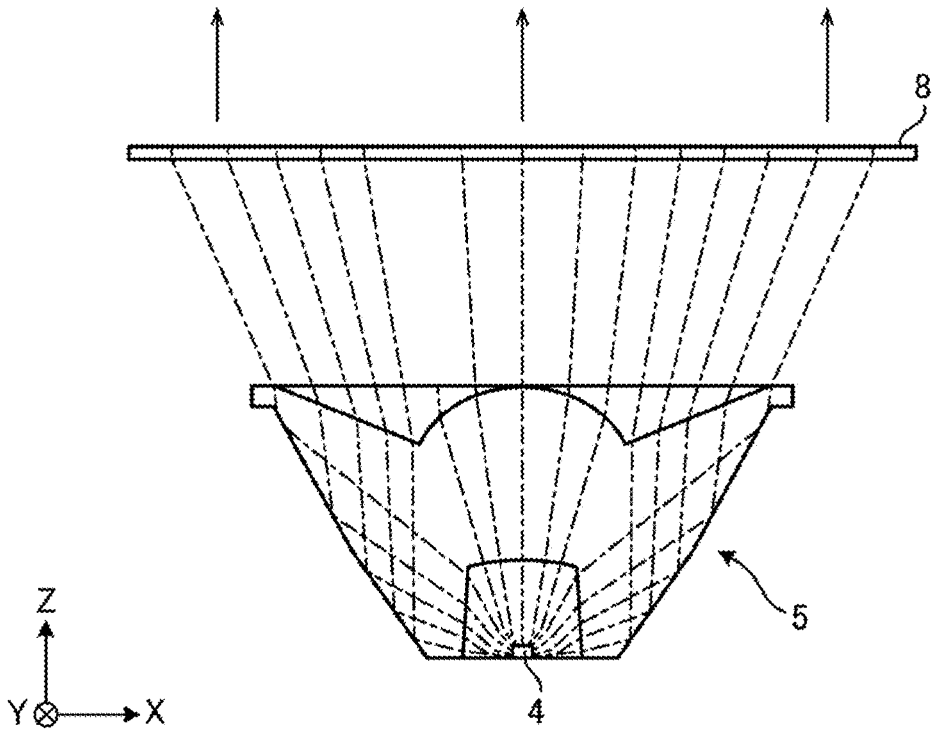
FIG. 4A is a diagram (1) illustrating an example capable of changing a light distribution by an interval between the cup lens and a condenser lens.
Figure 4B:
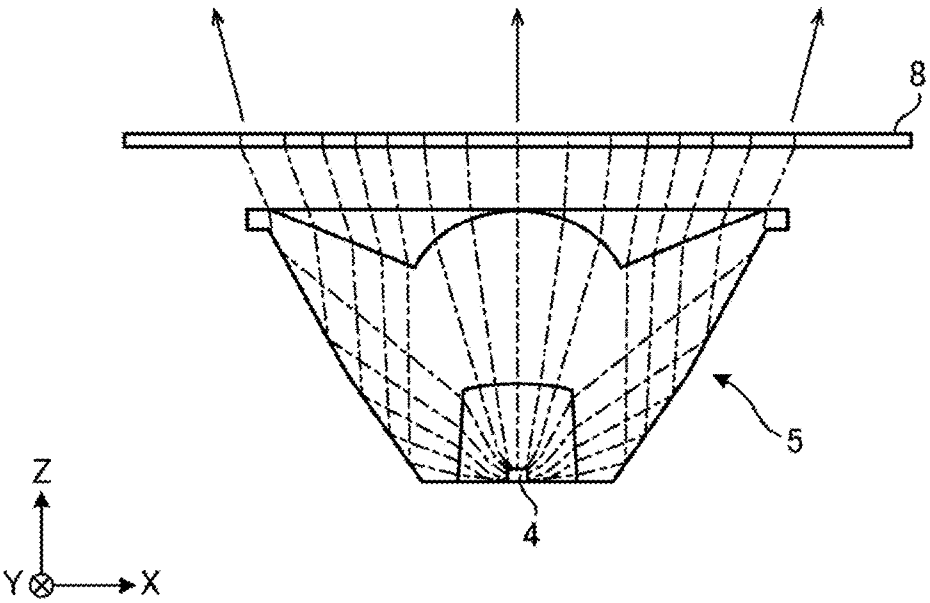
FIG. 4B is a diagram (2) illustrating an example capable of changing a light distribution by an interval between the cup lens and the condenser lens.

FIGS. 4A and 4B are diagrams illustrating examples capable of changing the light distribution by an interval between the cup lens 5 and the condenser lens 8. FIG. 4A illustrates that a wide interval is set between the cup lens 5 and the condenser lens 8. The light emitted from the cup lens 5 spreads to the effective diameter of the condenser lens 8, and is refracted into almost parallel light by the condenser lens 8, resulting in a narrow-angle light distribution.

FIG. 4B illustrates that a narrow interval is set between the cup lens 5 and the condenser lens 8. The light emitted from the cup lens 5 is not sufficiently refracted by the condenser lens 8 and spreads from the optical axis, resulting in a wide-angle light distribution. For example, the condenser lens 8 can be adjusted between the position in FIG. 4A and the position in FIG. 4B to achieve the desired light distribution.

Protruding Part at Emission Surface of Cup Lens

Figure 5A:
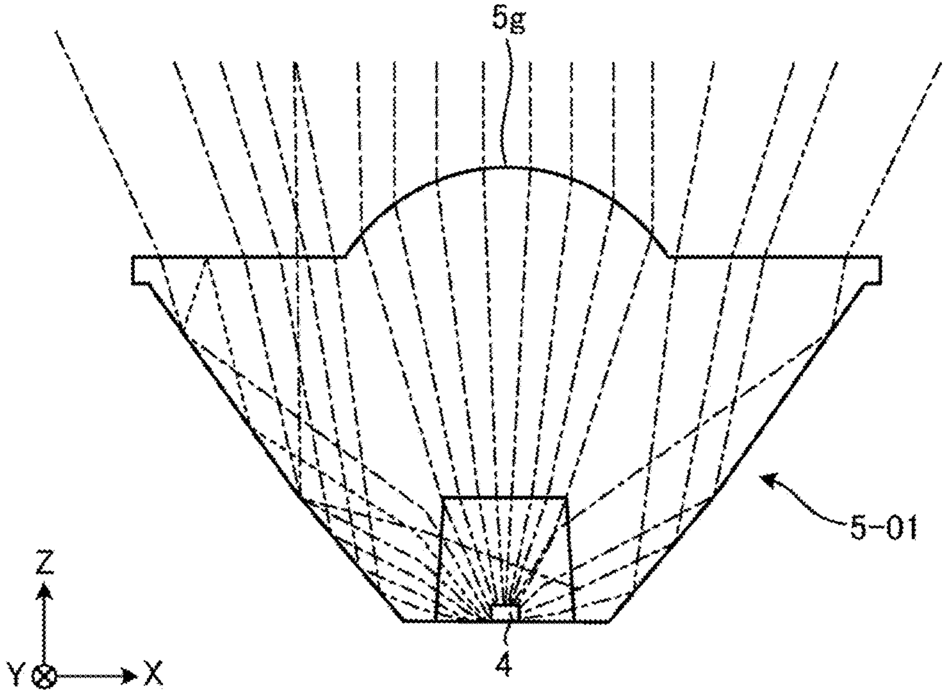
FIG. 5A is a diagram illustrating an example of a cup lens provided with a protruding part at an emission surface.
Figure 5B:
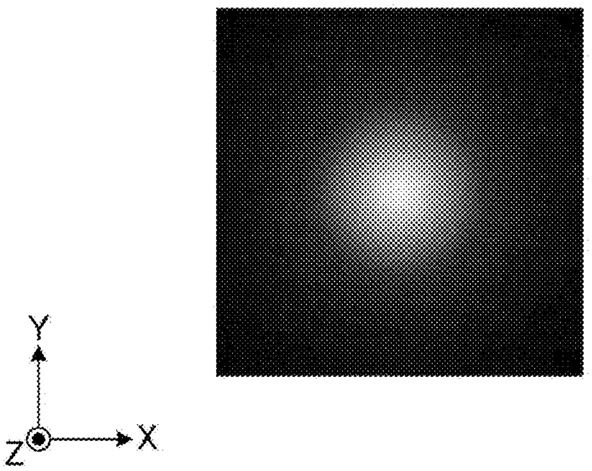
FIG. 5B is a diagram illustrating an example of brightness of the emission surface by the cup lens in FIG. 5A.

FIG. 5A is a diagram illustrating an example of a cup lens 5-01 provided with the protruding part 5*g* at the emission surface. FIG. 5B is a diagram illustrating an example of brightness of the emission surface by the cup lens 5-01 in FIG. 5A. Note that unlike the cup lens 5 in FIGS. 2 to 4B, the sloped part 5*h* is not provided at the emission surface in order to illustrate the effect of only the protruding part 5*g*.

Figure 6A:
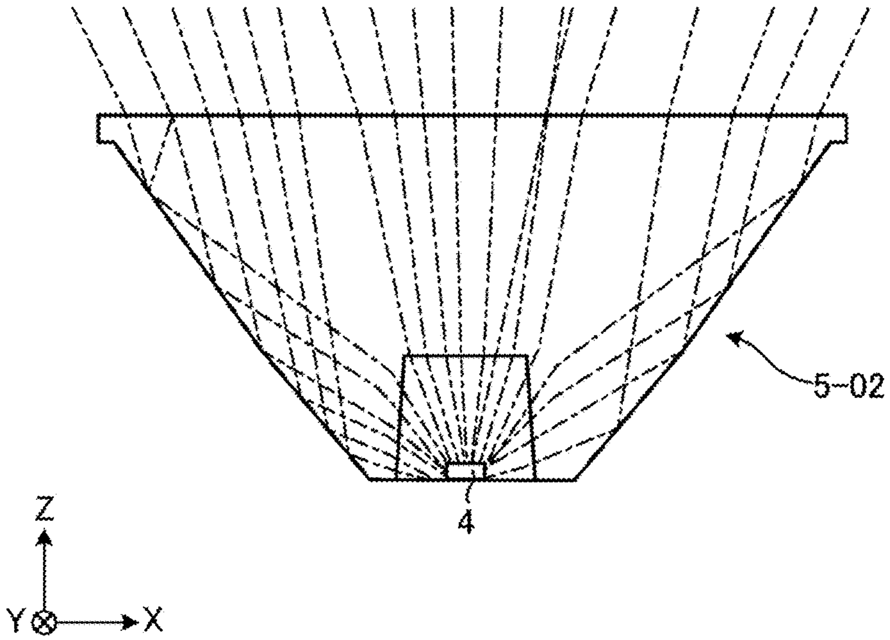
FIG. 6A is a diagram illustrating an example of a flat cup lens with no protruding part at the emission surface.
Figure 6B:
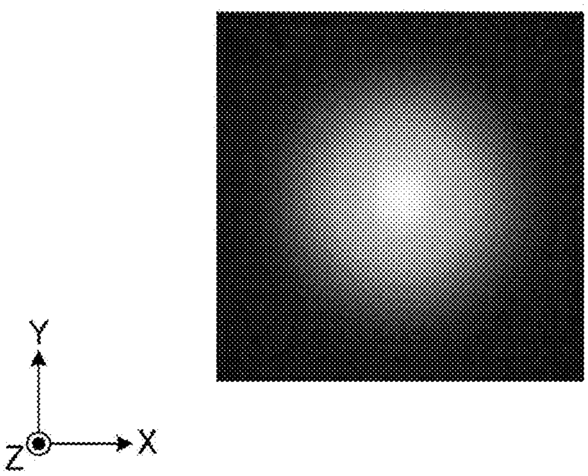
FIG. 6B is a diagram illustrating an example of brightness of the emission surface by the cup lens in FIG. 6A.

FIG. 6A is a diagram illustrating an example of a flat cup lens 5-02 without a protruding part at the emission surface. FIG. 6B is a diagram illustrating an example of brightness of the emission surface by the cup lens 5-02 in FIG. 6A.

In FIG. 6A, the light emitted from the light source 4 spreads from the optical axis even around the periphery of the center of the emission surface, and thus the brightness around the periphery of the center is noticeable and the appearance is unfavorable in FIG. 6B. In contrast, in FIG. 5A, the light emitted from the light source 4 is condensed to the optical axis side around the periphery of the center of the emission surface, and thus the brightness around the periphery of the center is reduced and the appearance is improved as in FIG. 5B.

Figure 7A:
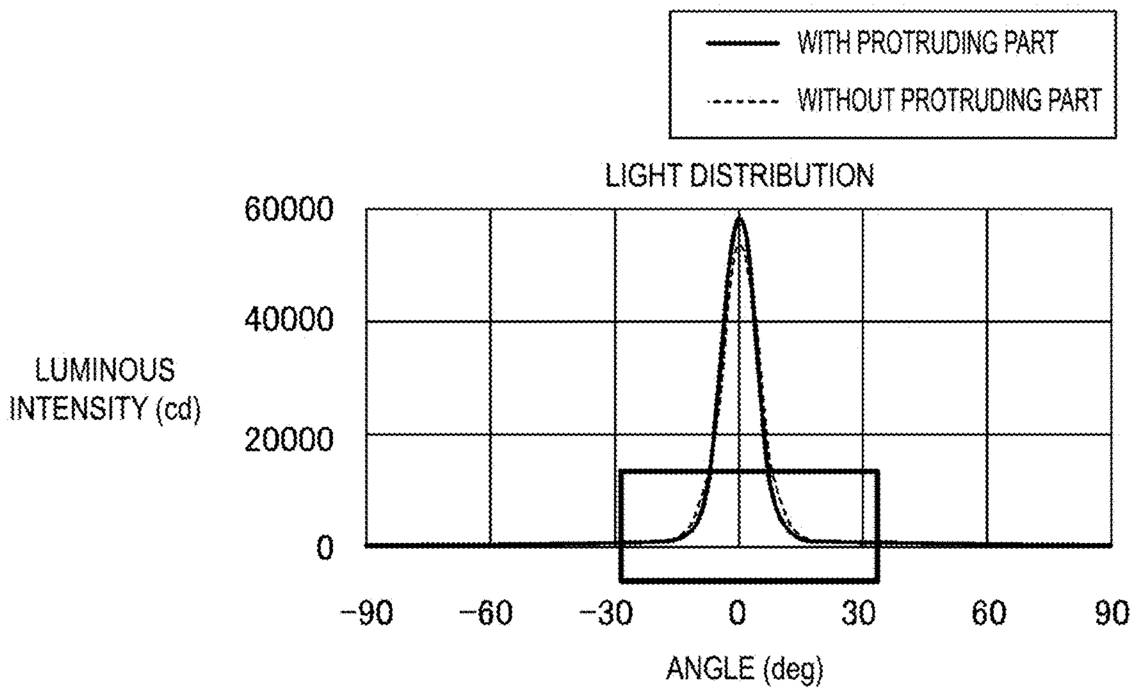
FIG. 7A is a diagram (1) showing an example of light distribution with and without a protruding part at the emission surface.
Figure 7B:
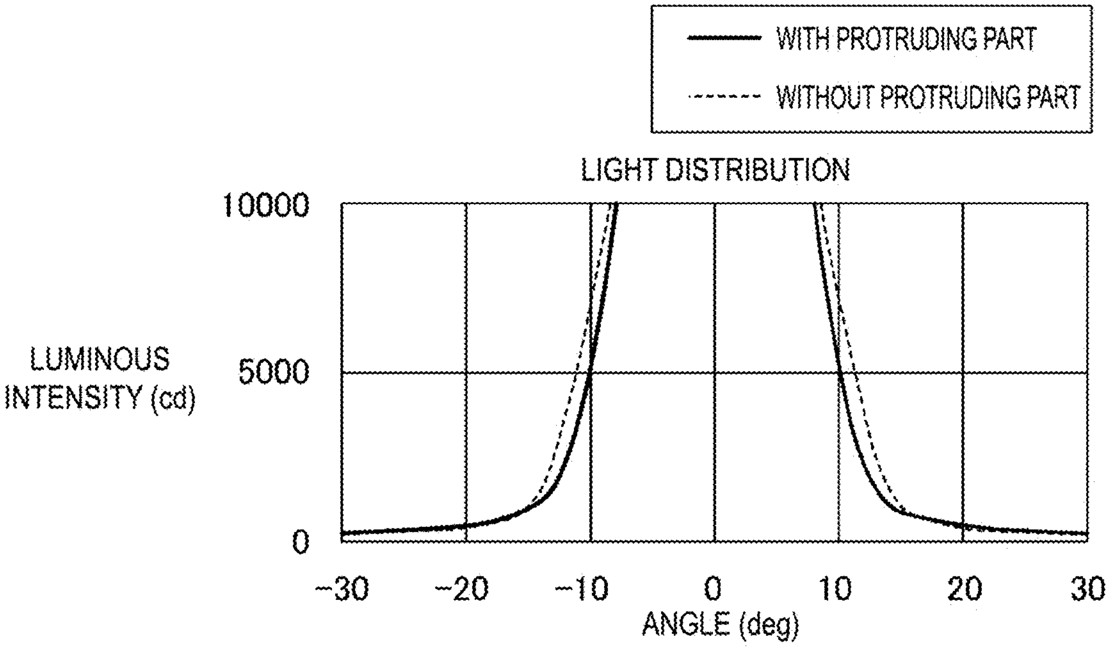
FIG. 7B is a diagram (2) showing an example of light distribution with and without a protruding part at the emission surface.

FIGS. 7A and 7B illustrate examples of light distribution with and without a protruding part at the emission surface. FIG. 7B is an enlarged diagram of the thick-framed part in FIG. 7A. In FIG. 7A and FIG. 7B, the degree of light condensation to angle θ being the optical axis direction is greater when there is a protruding part than when there is no protruding part.

Sloped Part at Emission Surface of Cup Lens

Figure 8A:
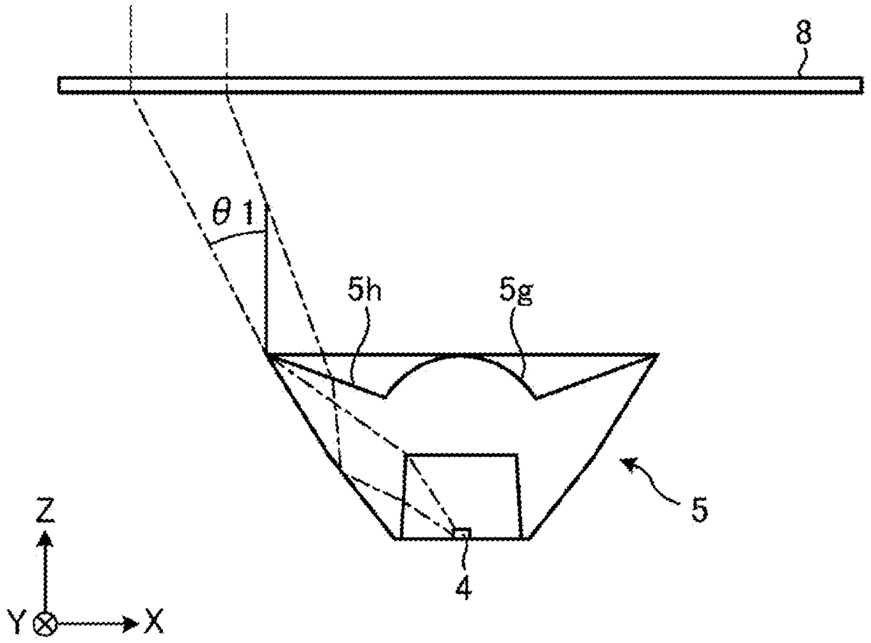
FIG. 8A is a diagram (1) illustrating an example of light spread around the end part by a cup lens with a sloped part at the emission surface.
Figure 8B:
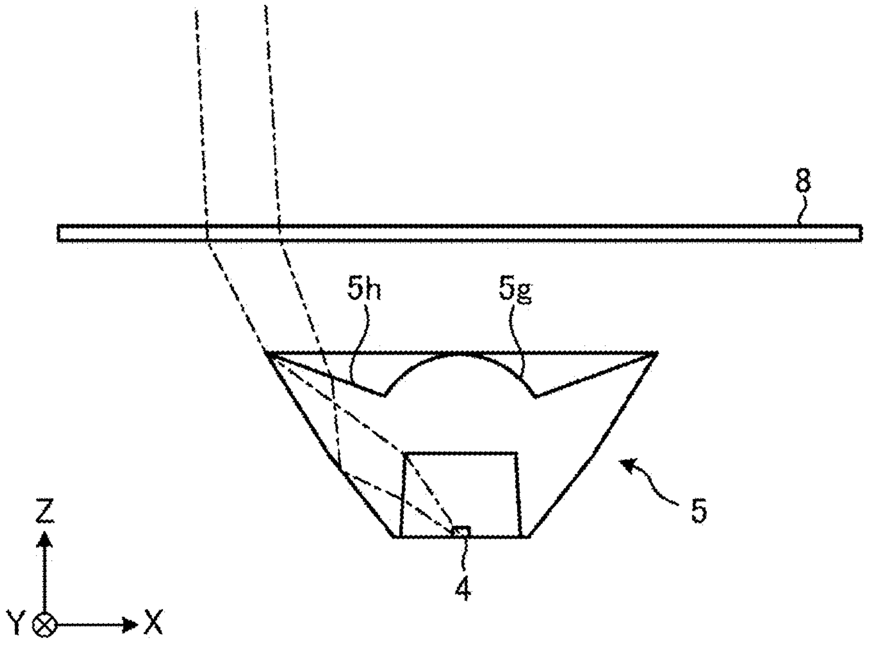
FIG. 8B is a diagram (2) illustrating an example of light spread around the end part by the cup lens with the sloped part at the emission surface.

FIGS. 8A and 8B are diagrams illustrating examples of light spread around the end part by the cup lens 5 with the sloped part 5*h* at the emission surface. FIG. 8A illustrates a state setting a wide interval between the cup lens 5 and the condenser lens 8. FIG. 8B illustrates a state setting a narrow interval between the cup lens 5 and the condenser lens 8.

Figure 9A:
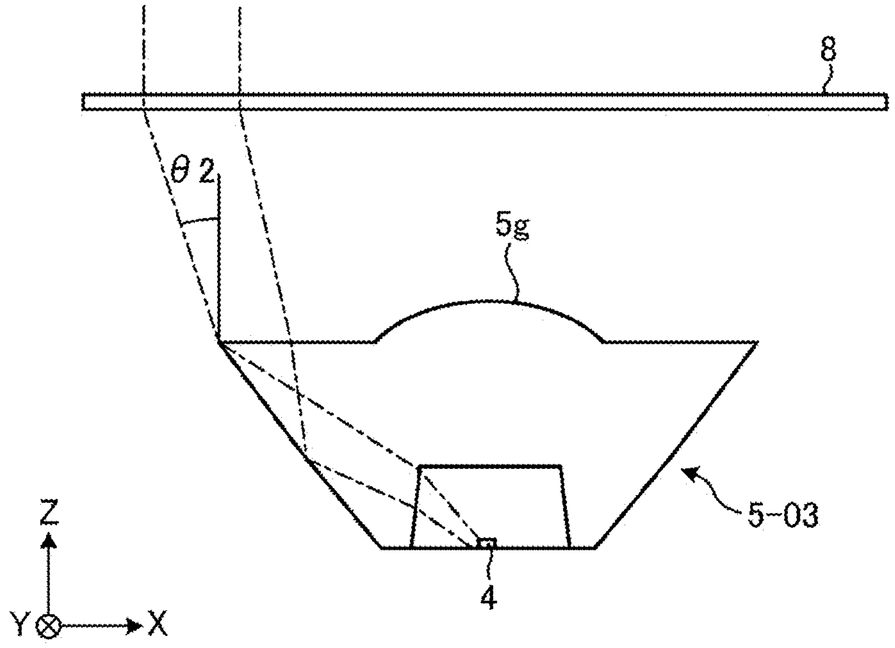
FIG. 9A is a diagram (1) illustrating an example of light spread around the end part by a cup lens without a sloped part at the emission surface.
Figure 9B:
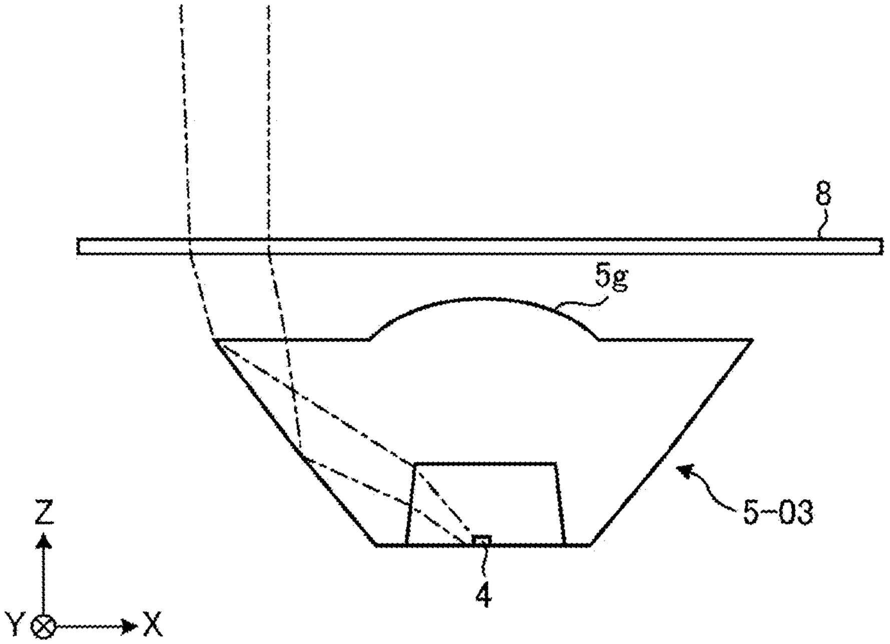
FIG. 9B is a diagram (2) illustrating an example of light spread around the end part by the cup lens without a sloped part at the emission surface.

FIGS. 9A and 9B are diagrams illustrating examples of light spread around the end part by the cup lens 5-03 without a sloped part at the emission surface. FIG. 9A illustrates a state setting a wide interval between the cup lens 5-03 and the condenser lens 8. FIG. 9B illustrates a state setting a narrow interval between the cup lens 5-03 and the condenser lens 8.

Generally, the light distribution of the light emitted from the cup lens is designed to spread outward from the optical axis. As the cup lens becomes larger, the angle (angle to normal direction) of light incident on the condenser lens becomes smaller because the difference between the effective diameter of the subsequent condenser lens and the outer diameter size of the cup lens becomes smaller. As the angle of light incident on the condenser lens becomes smaller, the amount of change in the incident position at the condenser lens becomes smaller during wide-angle light distribution with the condenser lens approaching the cup lens. This makes it difficult to achieve wide-angle light distribution.

Thus, in the present embodiment, as in FIGS. 8A and 8B, the cup lens 5 is miniaturized and the sloped part 5*h* is provided at the emission surface to increase the light distribution angle θ1 of the cup lens 5. In FIGS. 9A and 9B, the cup lens 5-03 is larger than in FIGS. 8A and 8B, and the light distribution angle θ2 of the cup lens 5 is smaller than in FIGS. 8A and 8B. Thus, in the embodiment of FIGS. 8A and 8B, when the distance between the cup lens 5 and the condenser lens 8 is changed, the incident region of the condenser lens 8 (the outermost diameter of incident light) can be greatly changed. As a result, when the condenser lens 8 is displaced within a predetermined distance with respect to the cup lens 5, the light distribution angle can be greatly changed, making it easier to perform control especially during wide-angle light distribution. In addition, miniaturizing the cup lens 5 increases the distance between the cup lens 5 and the condenser lens 8, making it easier to perform control during light distribution in this respect as well.

Design Examples of Cup Lens

Figure 10:
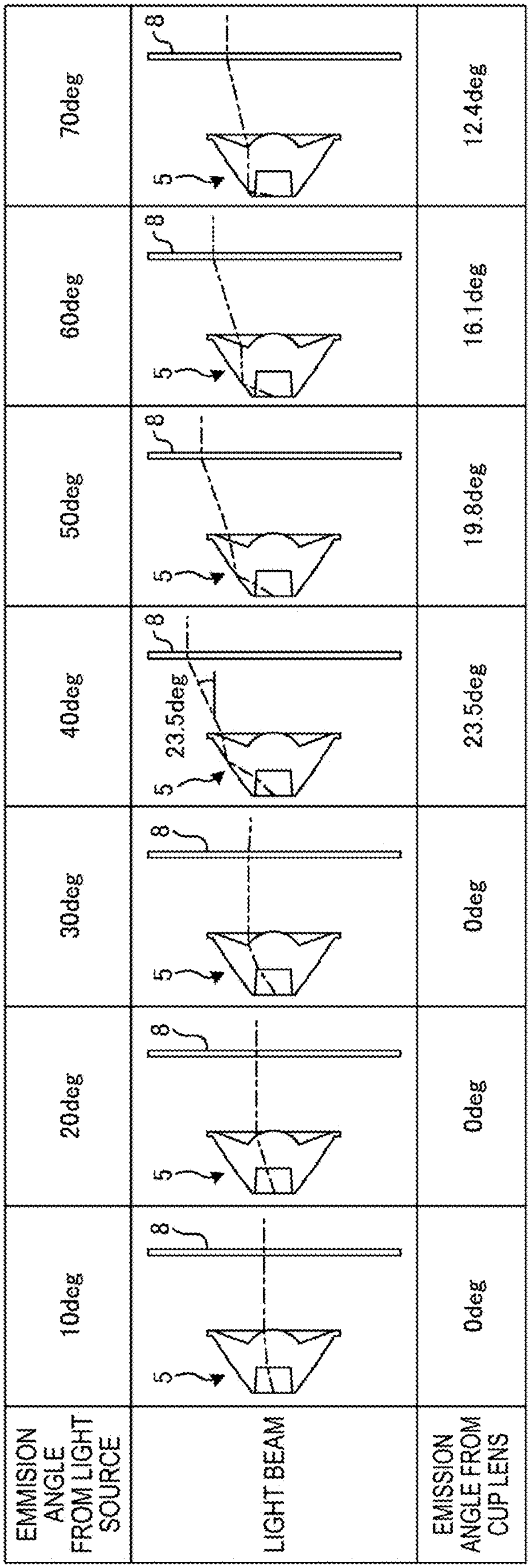
FIG. 10 is a diagram illustrating design examples of the shape of a cup lens.

FIG. 10 is a diagram illustrating design examples of the shape of the cup lens 5. As illustrated in FIG. 10, the "Emission angle from cup lens" is set according to the "Emission angle from light source", and the surface shape of the parts of the cup lens 5 is determined so that light is reflected and refracted according to that setting. For example, as in case when the "Emission angle from light source" is 10 deg, the light emitted from the light source 4 in the direction directly above is refracted by the inner curve of a bottom surface 5*f* (FIG. 3D) of the recessed part 5*d* and the outer curve of the protruding part 5*g* (FIG. 3D) before being emitted, and thus the shapes of these surfaces are determined such that the light is emitted at 0 deg. Moreover, for example, as in case the "Emission angle from light source" of 40 deg, the light emitted from the light source 4 in an inclined direction is totally reflected at the inner surface of the outer curve of the side surface 5*c* (FIG. 3D) and is refracted by the outer curve of the sloped part 5*h* (FIG. 3D) before being emitted, and thus the shapes of these surfaces are determined such that the light is emitted at 23.5 deg.

Comparative Example

Figure 11:
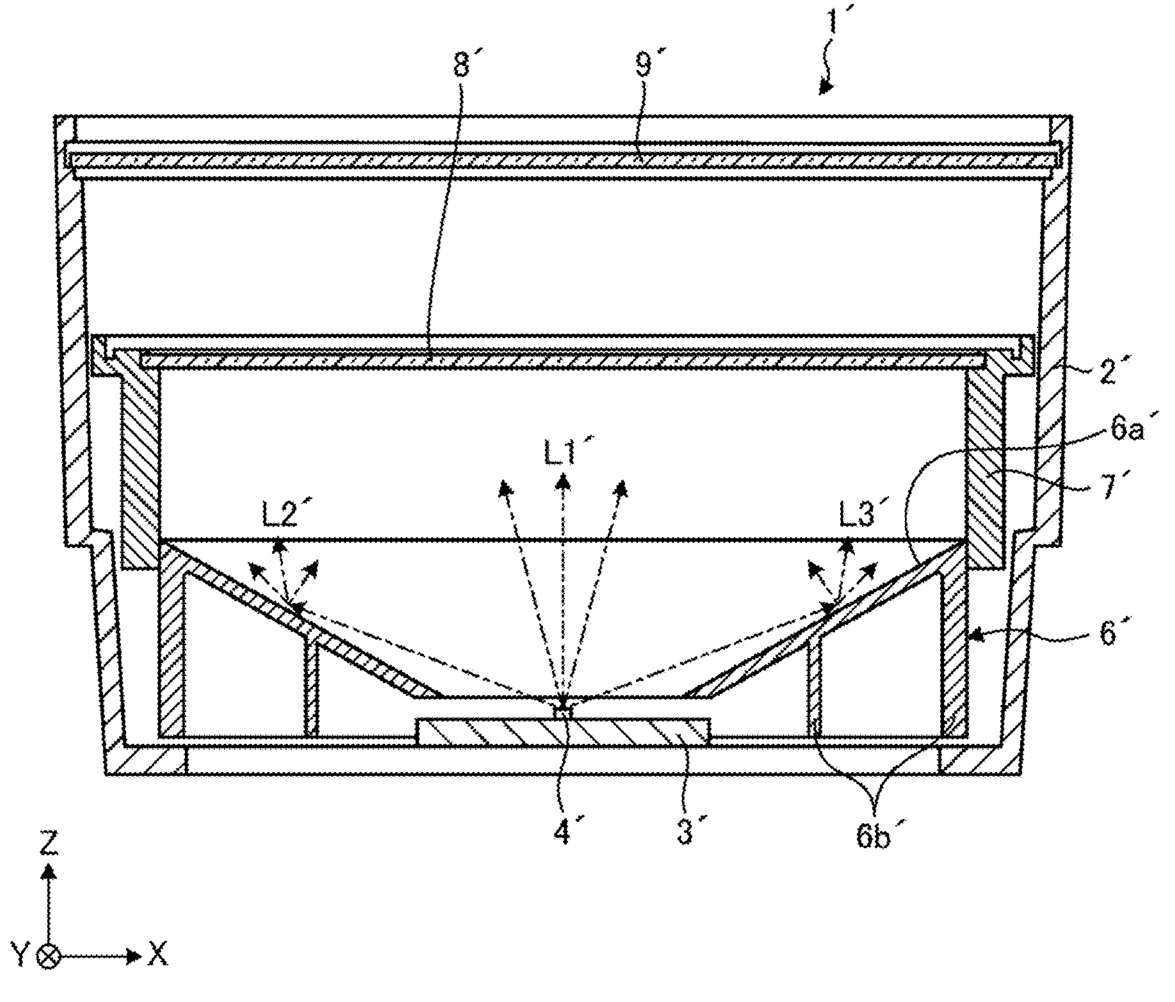
FIG. 11 is a cross-sectional view illustrating a configuration of a lighting device in a comparative example.

FIG. 11 is a cross-sectional view illustrating the configuration of a lighting device 1' of a comparative example. In FIG. 11, a frame 2', a light source holding part 3', a light source 4', a turn table 6', a reflection surface 6*a*', a support wall 6*b*', a condenser lens holding part 7', a condenser lens 8', and a cover lens 9' correspond to the frame 2, the light source holding part 3, the light source 4, the turn table 6, the reflection surface 6*a*, the support wall 6*b*, the condenser lens holding part 7, the condenser lens 8, and the cover lens 9 in FIG. 2, respectively. The difference is that the cup lens 5 is not provided, and that the reflection surface 6*a*' is used to reflect light from the light source 4'.

In FIG. 11, light incident on the condenser lens 8' directly from the light source 4', such as light L1', is controlled to be distributed as designed, but light diffusely reflected by the reflection surface 6*a*', such as light L2', L3', travels to every angle as stray light and causes glare. In addition, most stray light does not travel to around the center, and thus the luminous flux around the center is decreased and the luminous flux ratio is reduced. This results in a problem because glare (dazzling) tends to occur in a region slightly distant from the optical axis (e.g., a region of 40 deg or more from the optical axis) and the luminous flux ratio around the center (e.g., a region of 0 deg to 10 deg) cannot be increased.

Figure 12A:
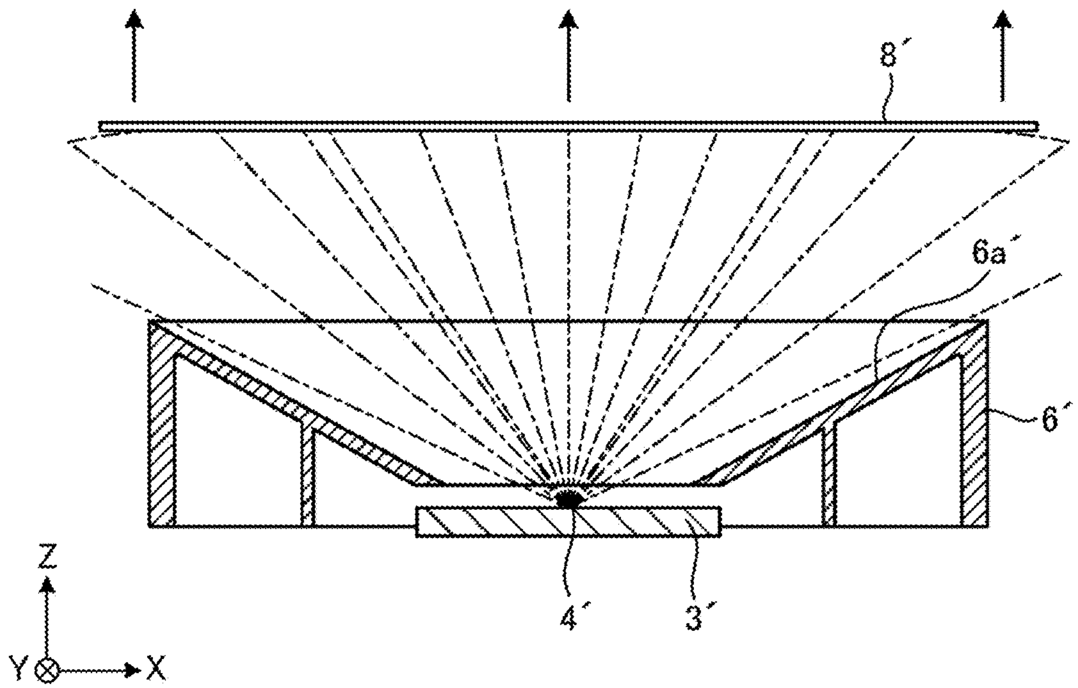
FIG. 12A is a diagram (1) illustrating an example of changing the light distribution in the comparative example.
Figure 12B:
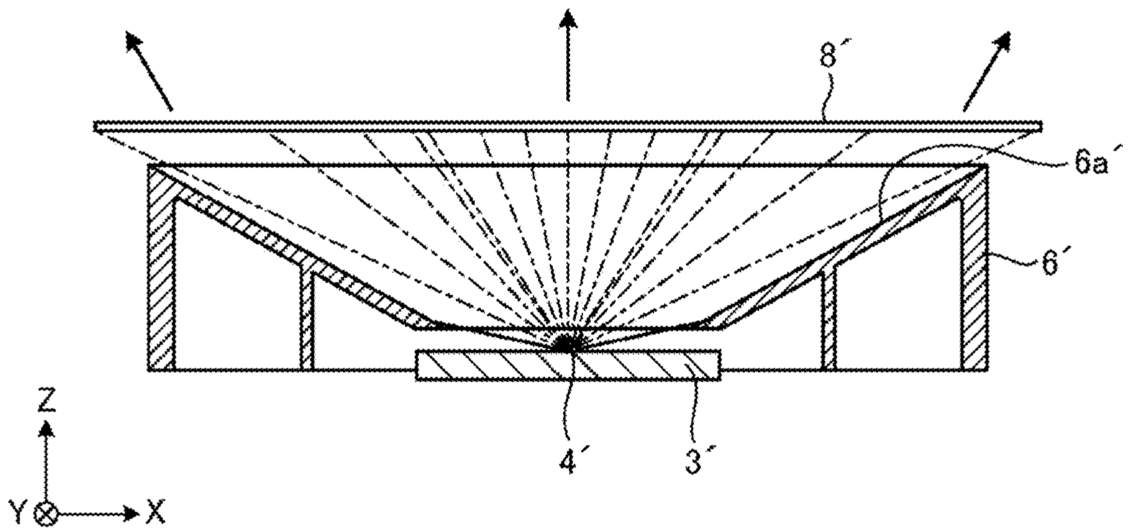
FIG. 12B is a diagram (2) illustrating an example of changing the light distribution in the comparative example.

FIGS. 12A and 12B illustrate an example of changing the light distribution in the comparative example. FIG. 12A illustrates that a wide interval is set between the light source 4' and the reflection surface 6*a*' and the condenser lens 8'. The light emitted from the light source 4' spreads to the effective diameter of the condenser lens 8' and is refracted into almost parallel light by the condenser lens 8', resulting in a narrow-angle light distribution. FIG. 12B illustrates that a narrow interval is set between the light source 4' and the reflection surface 6*a*' and the condenser lens 8'. The light emitted from the light source 4' is not sufficiently refracted by the condenser lens 8' and spreads from the optical axis, resulting in a wide-angle light distribution.

Luminous Flux Ratio

The luminous flux ratio per angle with respect to the optical axis and the cumulative total of the luminous flux ratios for the comparative example illustrated in FIGS. 11 to 12B and the embodiment illustrated in FIGS. 1 to 4B are illustrated in Table 1. The luminous flux ratio of leakage light at 40 deg to 90 deg was 24.43% in the comparative example, but decreased to 7.6% in the embodiment. The glare is reduced by the decrease in leakage light. Moreover, the luminous flux ratio around the center of 0 deg to 10 deg was 31.30% in the comparative example, but increased about twofold to 59.5% in the embodiment.

TABLE 1

| | Luminous flux ratio | | Cumulative total | |
|---|---|---|---|---|
| Angle (deg) | Comparative example | Embodiment | Comparative example | Embodiment |
| 0 to 10 | 31.30% | 59.5% | 31.30% | 59.5% |
| 10 to 20 | 14.52% | 21.3% | 45.82% | 80.8% |
| 20 to 30 | 15.60% | 6.0% | 61.42% | 86.8% |
| 30 to 40 | 14.14% | 5.6% | 75.57% | 92.4% |
| 40 to 90 | 24.43% | 7.6% | 100% | 100% |

Reduction in Color Irregularity

In the field of general lighting, "color lighting" using RGB (Red, Green, Blue) light sources and capable of irradiating colors other than white, is sometimes used in staging or the like. Here, for the light source, a plurality of light-emitting elements such as LEDs with different emission wavelengths corresponding to red, green, and blue are used. In this case, because the light-emitting elements with different emission wavelengths are arranged spaced apart even though minutely, color mixing is not sufficiently performed, and color irregularity tends to occur at the irradiation surface.

The configuration of the device is similar to the configuration of the lighting device 1 illustrated in FIGS. 1 to 4B, but the light source 4 is constituted by an arrangement of a plurality of light-emitting elements such as a plurality of LEDs with different emission wavelengths. Furthermore, although the basic shape of the cup lens 5 is similar, there are differences for each of the incident surface and the emission surface from the viewpoint of reducing color irregularity.

Figure 13A:
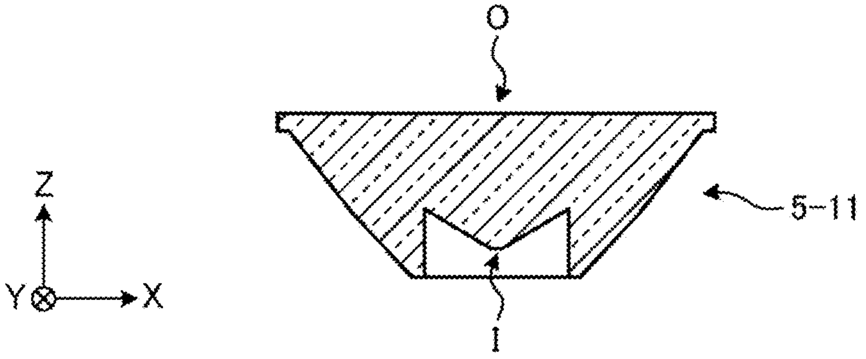
FIG. 13A is a diagram illustrating an example of a cup lens with an incident surface convex to the incoming light and a flat emission surface.

FIG. 13A is a diagram illustrating an example of a cup lens 5-11 with an incident surface I convex to the incoming light and a flat emission surface O. More precisely, the bottom surface 5*f* of the recessed part 5*d* of the cup lens 5 in FIG. 3D described above is convex to the incoming light, there are neither the protruding part 5*g* nor the sloped part 5*h*, and the top surface 5*b* extends in a flat manner. Hereafter, up to the descriptions of FIG. 19C, the incident surface I refers to the bottom surface 5*f* portion of the recessed part 5*d* of the cup lens 5 in FIG. 3D. The emission surface O refers to the top surface 5*b*, the protruding part 5*g*, and the sloped part 5*h* of the cup lens 5 in FIG. 3D.

Figure 13B:
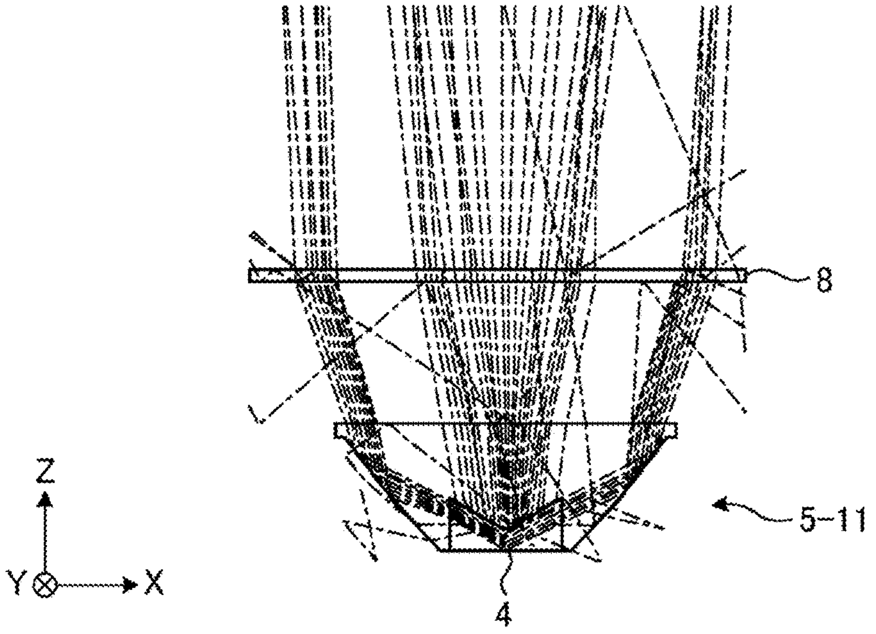
FIG. 13B is a diagram illustrating an example of optical paths from a light source by the cup lens in FIG. 13A.
Figure 13C:
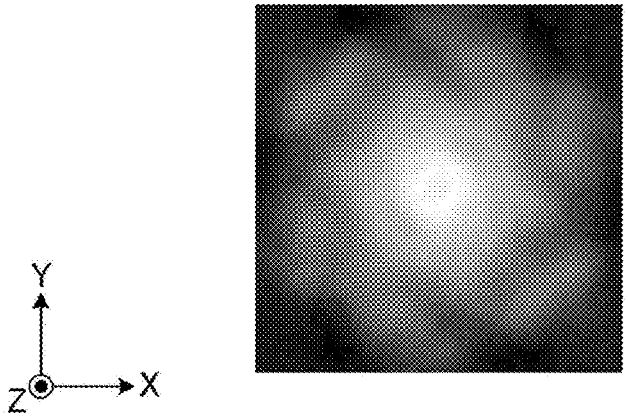
FIG. 13C is a diagram illustrating an example of brightness of the emission surface by the cup lens in FIG. 13A.

FIG. 13B is a diagram illustrating an example of optical paths from the light source 4 by the cup lens 5-11 in FIG. 13A. FIG. 13C is a diagram illustrating an example of brightness of the emission surface O by the cup lens 5-11 in FIG. 13A.

Figure 14A:
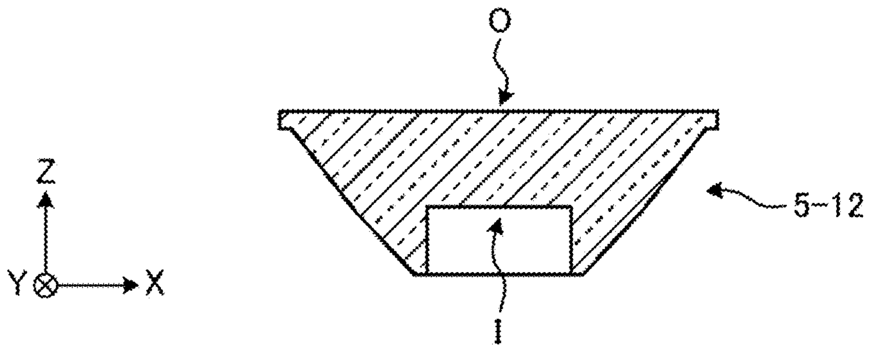
FIG. 14A is a diagram illustrating an example of a cup lens with a flat incident surface and a flat emission surface.
Figure 14B:
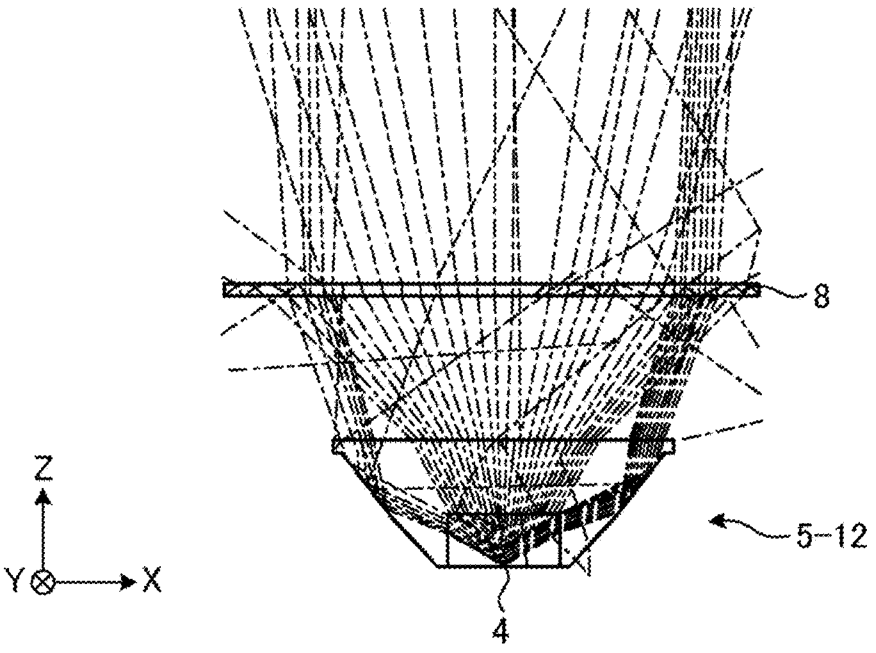
FIG. 14B is a diagram illustrating an example of optical paths from a light source by the cup lens in FIG. 14A.
Figure 14C:
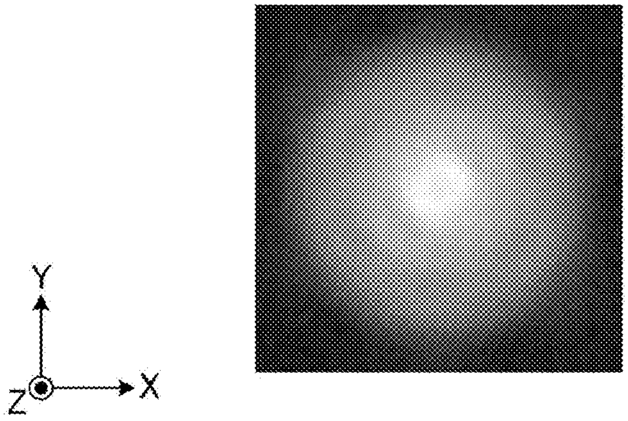
FIG. 14C is a diagram illustrating an example of brightness of the emission surface by the cup lens in FIG. 14A.

FIG. 14A is a diagram illustrating an example of a cup lens 5-12 with a flat incident surface I and a flat emission surface O. FIG. 14B is a diagram illustrating an example of optical paths from the light source 4 by the cup lens 5-12 in FIG. 14A. FIG. 14C is a diagram illustrating an example of brightness of the emission surface O by the cup lens 5-12 in FIG. 14A.

Figure 15A:
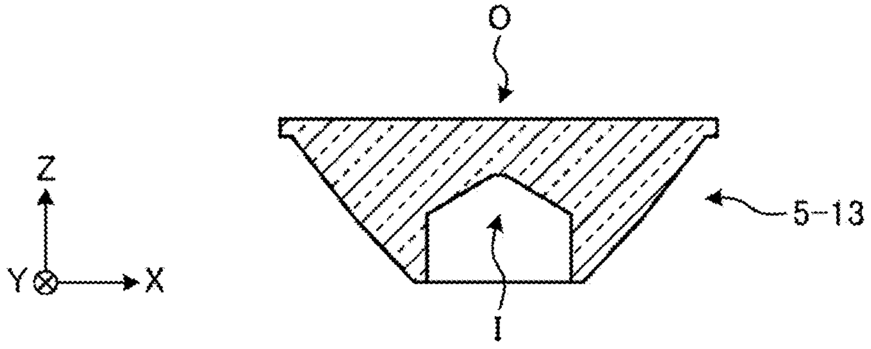
FIG. 15A is a diagram illustrating an example of a cup lens with an incident surface concave to the incoming light and a flat emission surface.
Figure 15B:
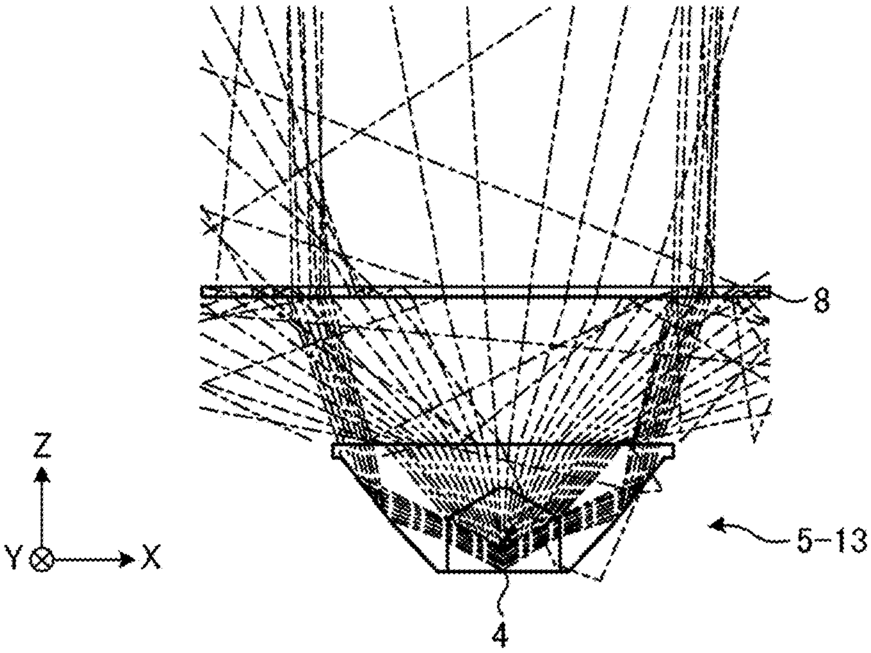
FIG. 15B is a diagram illustrating an example of optical paths from a light source by the cup lens in FIG. 15A.
Figure 15C:
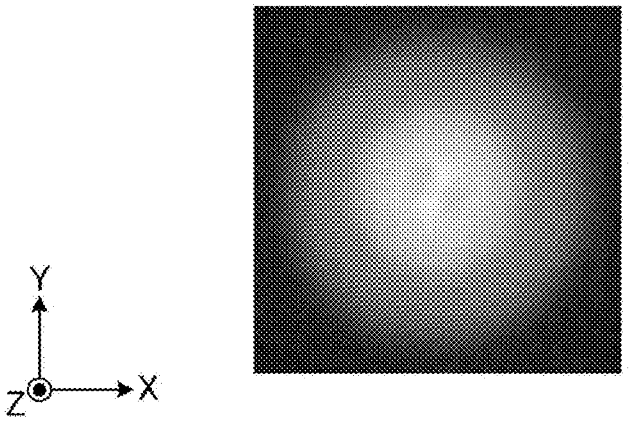
FIG. 15C is a diagram illustrating an example of brightness of the emission surface by the cup lens in FIG. 15A.

FIG. 15A is a diagram illustrating an example of a cup lens 5-13 with an incident surface I concave to the incoming light and a flat emission surface O. FIG. 15B is a diagram illustrating an example of optical paths from the light source 4 by the cup lens 5-13 in FIG. 15A. FIG. 15C is a diagram illustrating an example of brightness of the emission surface O by the cup lens 5-13 in FIG. 15A.

Figure 16A:
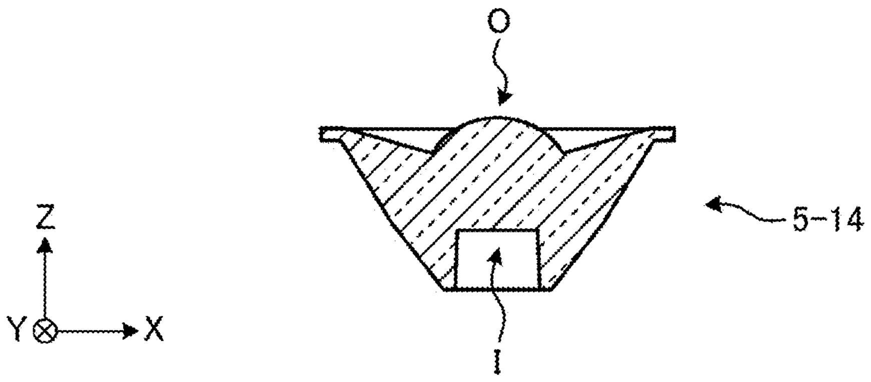
FIG. 16A is a diagram illustrating an example of a cup lens with a flat incident surface and an emission surface convex to the emission side.
Figure 16B:
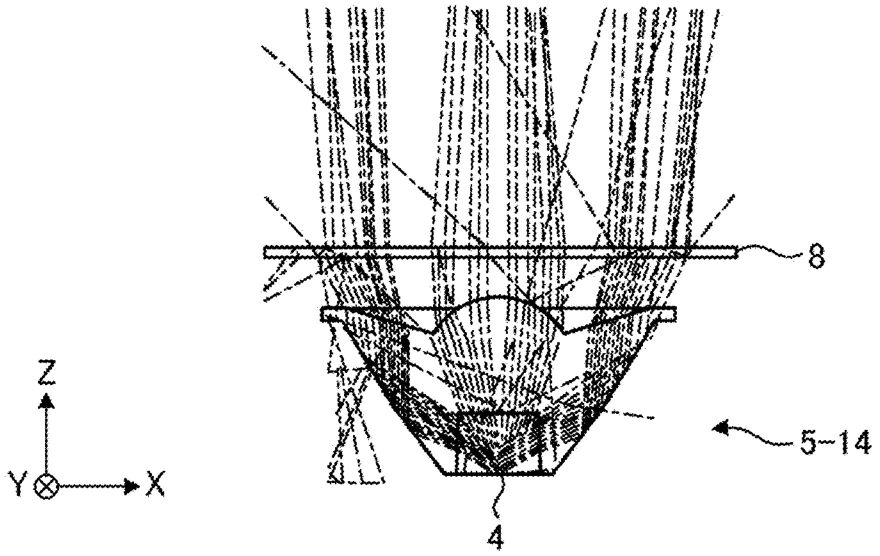
FIG. 16B is a diagram illustrating an example of optical paths from a light source by the cup lens in FIG. 16A.
Figure 16C:
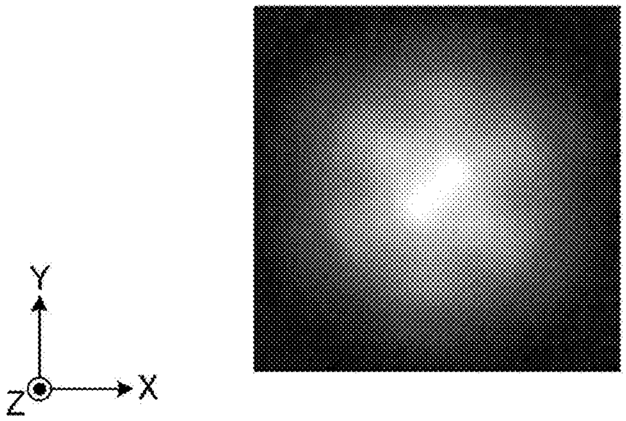
FIG. 16C is a diagram illustrating an example of brightness of the emission surface by the cup lens in FIG. 16A.

FIG. 16A is a diagram illustrating an example of a cup lens 5-14 with a flat incident surface I and an emission surface O convex to the emission side. FIG. 16B is a diagram illustrating an example of optical paths from the light source 4 by the cup lens 5-14 in FIG. 16A. FIG. 16C is a diagram illustrating an example of brightness of the emission surface O by the cup lens 5-14 in FIG. 16A.

Figure 17A:
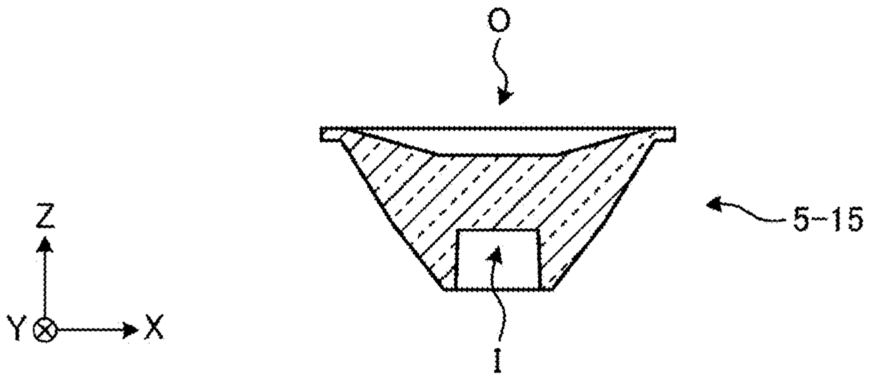
FIG. 17A is a diagram illustrating an example of a cup lens with a flat incident surface and an emission surface having a mortar shape.
Figure 17B:
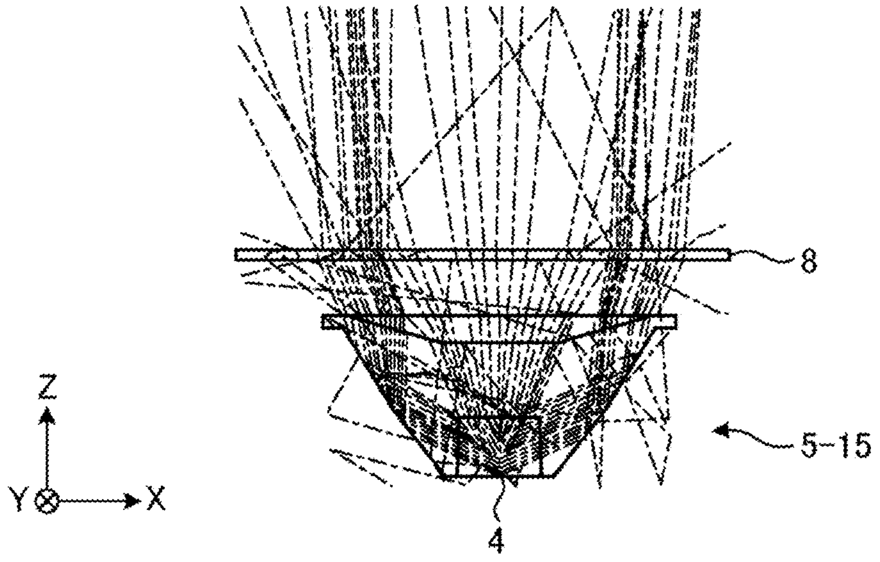
FIG. 17B is a diagram illustrating an example of optical paths from a light source by the cup lens in FIG. 17A.
Figure 17C:
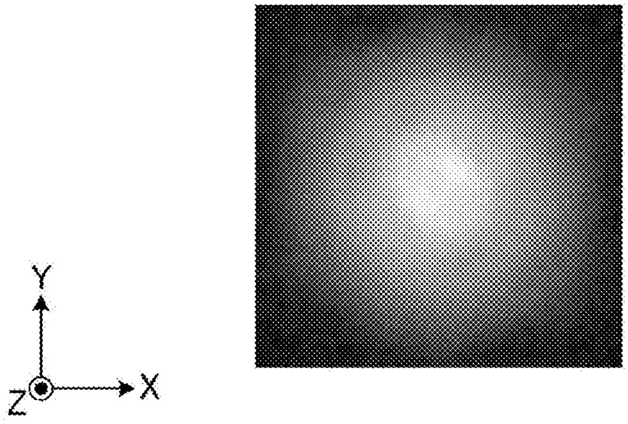
FIG. 17C is a diagram illustrating an example of brightness of the emission surface by the cup lens in FIG. 17A.

FIG. 17A is a diagram illustrating an example of a cup lens 5-15 with a flat incident surface I and an emission surface O having a mortar shape (with a sloped part). FIG. 17B is a diagram illustrating an example of optical paths from the light source 4 by the cup lens 5-15 in FIG. 17A. FIG. 17C is a diagram illustrating an example of brightness of the emission surface O by the cup lens 5-15 in FIG. 17A.

Figure 18A:
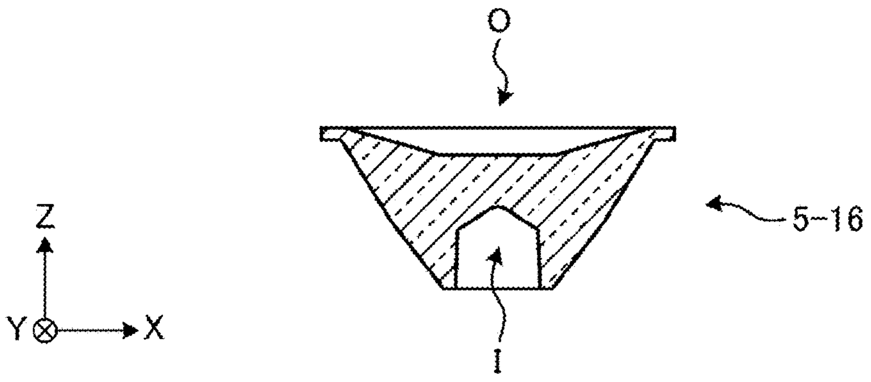
FIG. 18A is a diagram illustrating an example of a cup lens with an incident surface concave to the incoming light and an emission surface having a mortar shape.
Figure 18B:
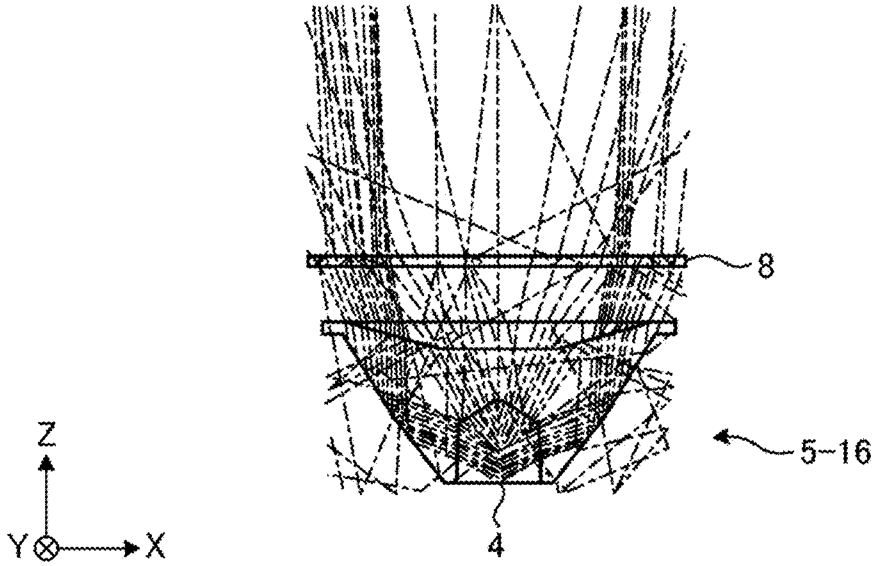
FIG. 18B is a diagram illustrating an example of optical paths from a light source by the cup lens in FIG. 18A.
Figure 18C:
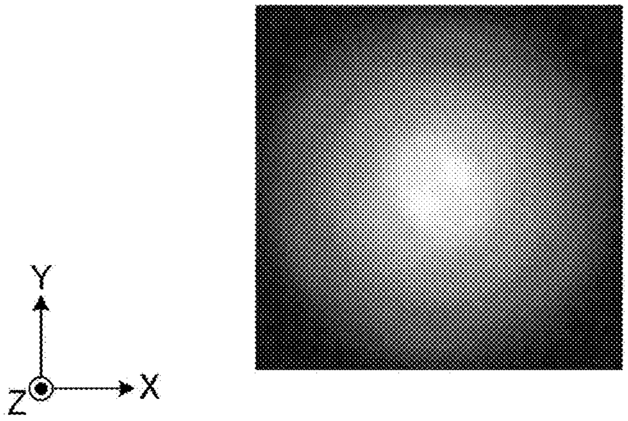
FIG. 18C is a diagram illustrating an example of brightness of the emission surface by the cup lens in FIG. 18A.

FIG. 18A is a diagram illustrating an example of a cup lens 5-16 with an incident surface I concave to the incoming light and an emission surface O having a mortar shape. FIG. 18B is a diagram illustrating an example of optical paths from the light source 4 by the cup lens 5-16 in FIG. 18A. FIG. 18C is a diagram illustrating an example of brightness of the emission surface O by the cup lens 5-16 in FIG. 18A.

Figure 19A:
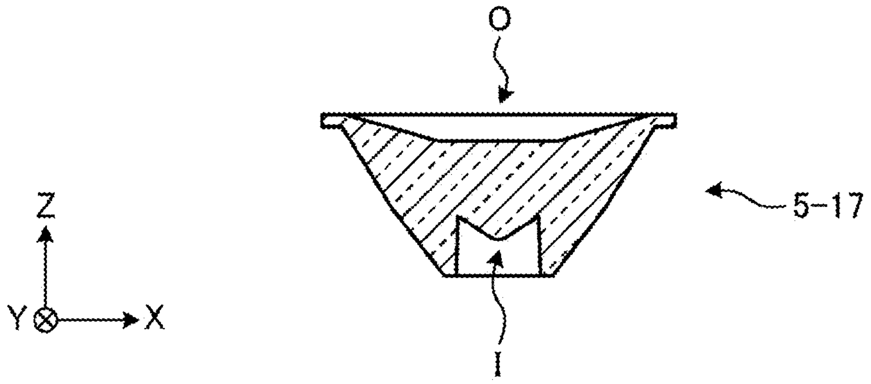
FIG. 19A is a diagram illustrating an example of a cup lens with an incident surface convex to the incoming light and an emission surface having a mortar shape.
Figure 19B:
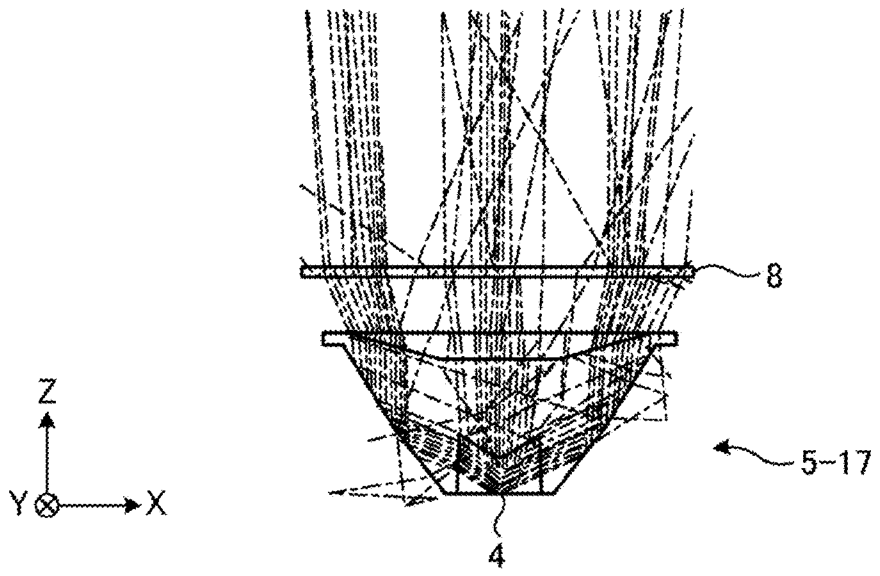
FIG. 19B is a diagram illustrating an example of optical paths from a light source by the cup lens in FIG. 19A.
Figure 19C:
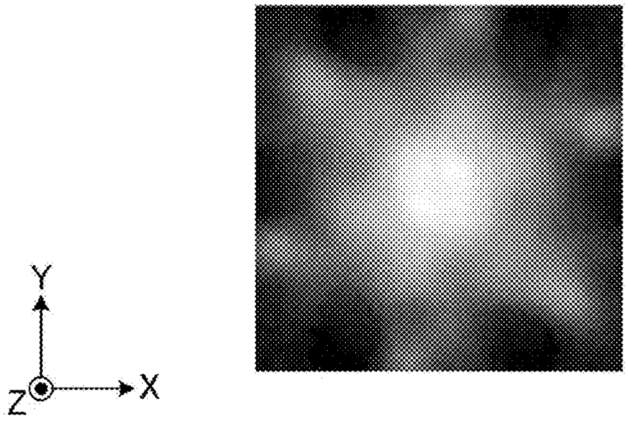
FIG. 19C is a diagram illustrating an example of brightness of the emission surface by the cup lens in FIG. 19A.

FIG. 19A is a diagram illustrating an example of a cup lens 5-17 with an incident surface I convex to the incoming light and an emission surface O having a mortar shape. FIG. 19B is a diagram illustrating an example of optical paths from the light source 4 by the cup lens 5-17 in FIG. 19A. FIG. 19C is a diagram illustrating an example of brightness of the emission surface O by the cup lens 5-17 in FIG. 19A.

In FIGS. 13A, 14A, and 15A, the emission surfaces O of the cup lenses 5-11, 5-12, and 5-13 are flat, but the incident surfaces I are different from each other in shape. The incident surface I is convex to the incoming light in FIG. 13A, flat in FIG. 14A, and concave to the incoming light in FIG. 15A. As is clear from FIGS. 13B, 14B, and 15B each illustrating optical paths, and FIGS. 13C, 14C, and 15C illustrating the brightness of the emission surface O, the cup lens 5-12 in FIG. 14A with the flat incident surface I and the cup lens 5-13 in FIG. 15A with the concave incident surface I have increased diffusivity at the center part, and have reduced color irregularity at the time of emission from the cup lens 5-12, 5-13. It has been confirmed that for the irradiation surface as the final lighting device as well, the color irregularity at the outer peripheral part has been reduced, and the color difference Δu' v' has also decreased to 0.005.

In the case of a cup lens 5-14 with a convex emission surface O and a flat incident surface I as in FIG. 16A, color irregularity becomes conspicuous. In this case, by making the emission surface O flat as in FIG. 14A, or by making the emission surface O mortar-shaped as in FIG. 17A, the effect of mixing can be obtained and color irregularity can be reduced.

In the case of the emission surface O having a mortar shape (FIGS. 17A, 18A, 19A), the effect of reducing color irregularity is obtained when the incident surface I is concave as in FIG. 18A, but color irregularity deteriorates when the incident surface I is convex as in FIG. 19A.

From the above, it is desirable that the incident surface I of the cup lens 5 is a flat surface or a surface concave to the incident side from the viewpoint of color mixing of the light emitted from the light source. Additionally, the emission surface O of the cup lens 5 is preferably a flat surface or a surface having a mortar shape. Note that it is not possible to completely remove color irregularity at the center part of the final irradiation surface by the shape of the incident surface I and the emission surface O of the cup lens 5. For complete removal, it may be necessary to increase the diffusivity of the condenser lens 8 and the cover lens 9 attached above the condenser lens 8.

The embodiments of the disclosure have been described above, but the disclosure is not limited to the embodiments described above, and various modifications are possible without departing from the spirit of the disclosure.

As described above, a lighting device according to an embodiment includes: a light source configured to emit light in a punctiform manner; a cup lens arranged at the emission side of the light source; and a condenser lens arranged at the emission side of the cup lens, wherein the cup lens includes: a bottom surface having a first outer shape and having a substantially circular shape; a top surface having a second outer shape larger than the first outer shape and having a substantially circular shape, the top surface being at the emission side of and spaced apart from the bottom surface in the optical axis direction; a side surface continuous with the bottom surface and the top surface; and a recessed part having a substantially cylindrical shape, provided substantially at the center of the bottom surface, and accommodating the light source. This reduces glare and increases the luminous flux ratio around the center. That is, the light emitted from the light source can be focused to the condenser lens as designed by the cup lens, and glare is reduced because stray light does not occur. In addition, stray light can be focused around the center, increasing the luminous flux ratio.

Furthermore, the condenser lens is a Fresnel lens. This makes it possible to obtain a thin condenser lens and miniaturize the lighting device.

Furthermore, the condenser lens is supported movably in the optical axis direction with respect to the light source and the cup lens. This makes it possible to control light distribution from narrow light distribution to wide light distribution.

Additionally, the cup lens includes a protruding part provided substantially at the center of the top surface. This allows light around the periphery of the center of the emission surface to be condensed, eliminating the problem of light around the periphery of the center spreading out and making the appearance unfavorable.

Additionally, the cup lens includes a sloped part sloping to the incident side from the outer peripheral part of the top surface toward the center. This makes it possible to make the light emitted from the cup lens spread out more from the optical axis, facilitating light distribution control by adjusting the interval between the condenser lens and the cup lens, and also makes it possible to miniaturize the cup lens.

In addition, a plurality of light-emitting elements with different emission wavelengths are arranged as the light source, and the bottom surface of the recessed part being the incident surface of the cup lens is a flat surface or a surface concave to the incident side. Thus, color irregularity can be reduced even when a light source arranged with a plurality of light-emitting elements, such as a plurality of LEDs with different emission wavelengths, is used.

In addition, the light source includes a plurality of light-emitting elements with different emission wavelengths, and the top surface being the emission surface of the cup lens is a flat surface or a surface having a mortar shape. Thus, color irregularity can be reduced even when a light source arranged with a plurality of light-emitting elements, such as a plurality of LEDs with different emission wavelengths, is used.

Further, the disclosure is not limited by the above embodiments. Also included in the disclosure are those constructed by suitably combining the above-described components. Further effects and variations can also be easily derived by those skilled in the art. Thus, the broader aspect of the disclosure is not limited to the above embodiments, and various modifications are possible.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A lighting device comprising:

a light source configured to emit light in a punctiform manner;

a cup lens arranged at an emission side of the light source; and a condenser lens arranged at an emission side of the cup lens, wherein the cup lens includes:

a bottom surface having a first outer shape and having a substantially circular shape, a top surface having a second outer shape larger than the first outer shape and having a substantially circular shape, the top surface being at an emission side of and spaced apart from the bottom surface in an optical axis direction, a side surface continuous with the bottom surface and the top surface, and a recessed part having a substantially cylindrical shape, provided substantially at the center of the bottom surface, and accommodating the light source, a sloped part sloping to the incident side from an outer peripheral part of the top surface toward the center, and the cup lens is configured to spread light emitted from the sloped part outward from the optical axis, the outer diameter size of the condenser lens is greater than the outer diameter size of the cup lens, and greater than the outermost diameter of incident light, which is the diameter of the incident region of the condenser lens of the light emitted from the outermost of the sloped part of the cup lens among the light emitted from the center of the light source when the distance between the cup lens and the condenser lens becomes largest within a predetermined distance of which the condenser lens is displaced with respect to the cup lens, the outermost diameter of incident light becomes larger in accordance with the distance between the cup lens and the condenser lens within the predetermined distance, the condenser lens is a Fresnel lens, and is supported movably in the optical axis direction with respect to the light source and the cup lens.

2. The lighting device according to claim 1, wherein the cup lens includes a protruding part provided substantially at the center of the top surface.

3. The lighting device according to claim 1, wherein a plurality of light-emitting elements with different emission wavelengths are arranged as the light source, and the bottom surface of the recessed part being an incident surface of the cup lens is a flat surface or a surface concave to an incident side.

4. The lighting device according to claim 1, wherein a plurality of light-emitting elements with different emission wavelengths are arranged as the light source, and the top surface being an emission surface of the cup lens is a flat surface or a surface having a mortar shape.

5. The lighting device of claim 1, wherein the condenser lens is the Fresnel lens having a substantially disk shape.

* * * * *